United States Patent [19]

Sturm

[11] 4,375,591
[45] Mar. 1, 1983

[54] THERMOPLASTIC WELDING SLEEVE

[76] Inventor: Werner Sturm, Allerheiligenstrasse 624, Hägendorf, Switzerland

[21] Appl. No.: 293,383

[22] Filed: Aug. 17, 1981

[30] Foreign Application Priority Data

Aug. 29, 1980 [CH] Switzerland .................. 6545/80

[51] Int. Cl.³ .............................................. H05B 3/58
[52] U.S. Cl. .................................. 219/544; 219/535; 219/528
[58] Field of Search ............... 219/528, 522, 534, 535, 219/541, 544; 425/406; 156/272, 275, 380; 285/21, 22, 260, 292, 423, DIG. 8; 264/272; 338/226

[56] References Cited

U.S. PATENT DOCUMENTS

| | | | |
|---|---|---|---|
| 3,061,503 | 10/1962 | Gould et al. | 156/275 |
| 3,062,940 | 11/1962 | Bauer et al. | 219/544 |
| 3,094,452 | 6/1963 | Von Riegen et al. | 156/275 |
| 3,943,334 | 3/1976 | Sturm | 219/544 |
| 4,117,311 | 9/1978 | Sturm | 219/544 |
| 4,147,926 | 4/1979 | Stähli | 219/535 |
| 4,176,274 | 11/1979 | Lippera | 219/544 X |
| 4,224,505 | 9/1980 | Sturm | 219/544 |
| 4,313,053 | 1/1982 | Sturm | 219/544 |

*Primary Examiner*—Volodymyr Y. Mayewsky
*Attorney, Agent, or Firm*—Roylance, Abrams, Berdo & Farley

[57] ABSTRACT

A welding sleeve has an inner body with a grooved outer surface, a surrounding outer body and a resistance heating wire therebetween. The inner wall, between the bottoms of the grooves and inner surface of the inner body, increases in thickness toward the axial center of the sleeve. During welding, the center of the sleeve and the adjacent axial ends of the parts to be joined are heated later than the axial ends of the sleeve, thereby increasing the stability of the joint formed. Also, disclosed are improved mold assemblies for forming the welding sleeve.

8 Claims, 5 Drawing Figures

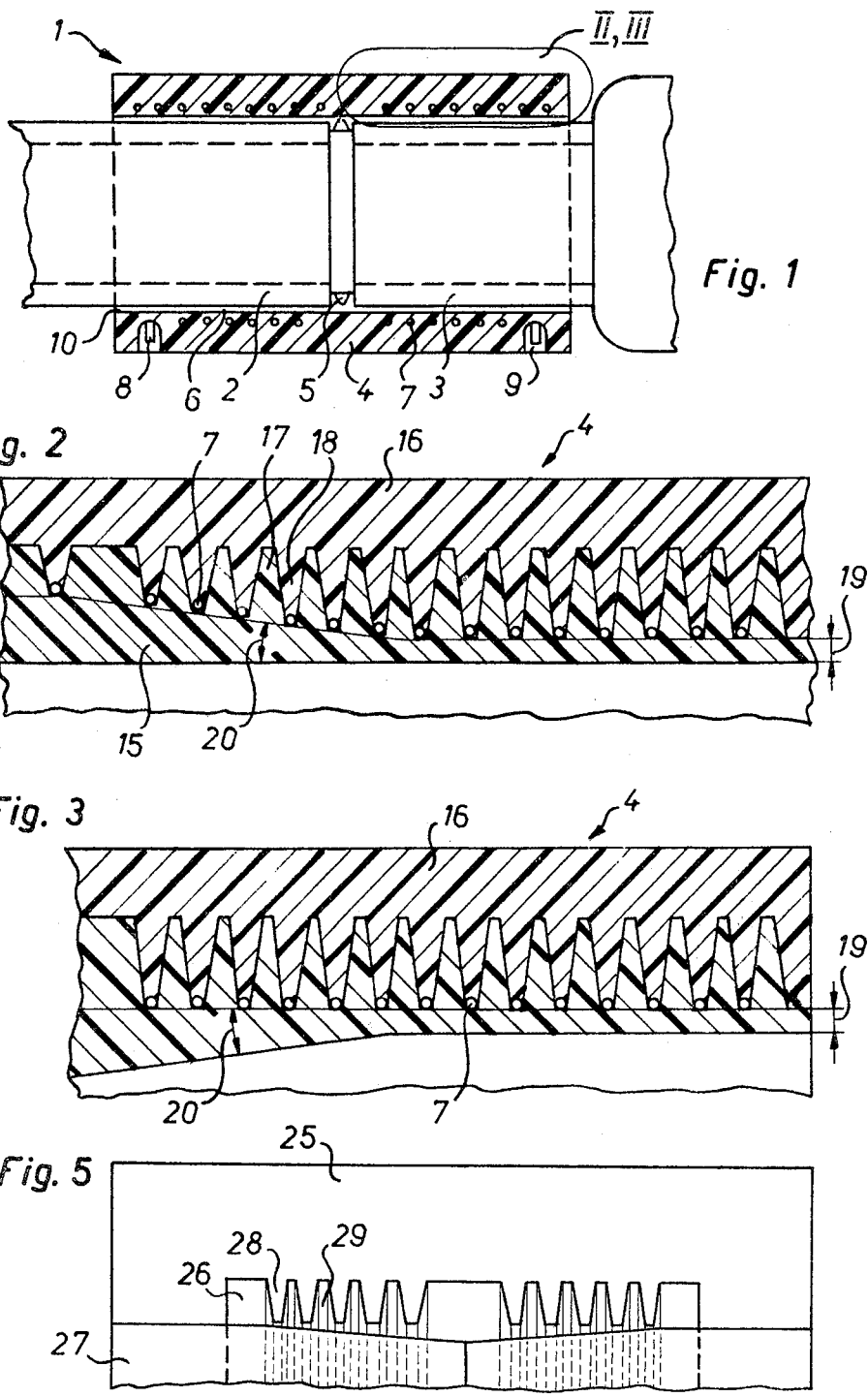

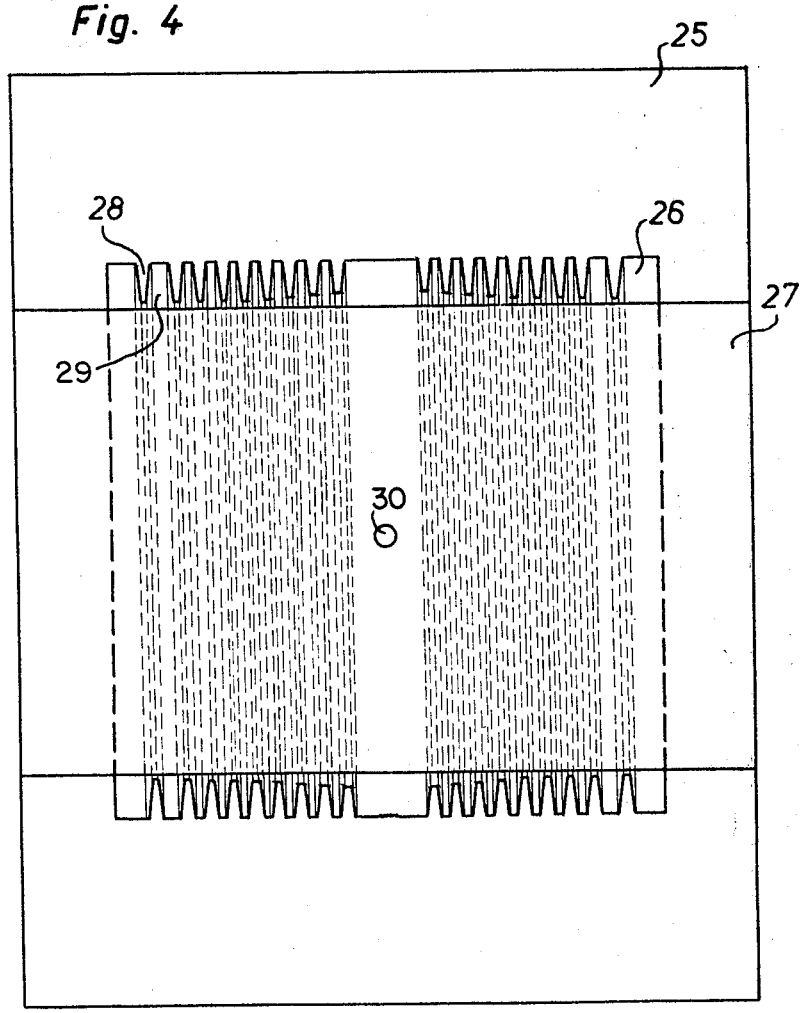

THERMOPLASTIC WELDING SLEEVE

The invention relates to a thermoplastic welding sleeve having a resistance heating wire embedded in the sleeve for joining thermoplastic line members and a mold assembly for making it. The sleeve comprises an inner body of variable wall thickness with an outer surface having grooves separated by webs, and an outer body embracing the inner body and extending into the grooves. The resistance heating wire is received in the grooves.

BACKGROUND OF THE INVENTION

Numerous constructions of welding sleeves are known in which a resistance heating wire is placed in the sleeve and supplied with electric power to produce heat for partly melting the sleeve and connecting it to the line members to be joined. In one known construction (German Pat. No. 2,410,039), the sleeve comprises an inner body with grooves on its outer periphery and an outer body. A resistance heating wire is placed along the bottoms of the grooves in the inner body. This known welding sleeve is used to a considerable extent for joining thermoplastic line members.

The term line members includes line or pipe parts, and shaped parts and fittings, whose connections and end portions are welded by means of welding sleeves.

In order to ensure a completely satisfactory connection, it is necessary for the connections or ends of the line members to be introduced up to a stop members located within the sleeve prior to carrying out the welding process. If one of the connections is not completely inserted into the sleeve, increased heating can occur in this area. In extreme cases, the sleeve can be destroyed at this point such that a completely satisfactory connection of the line member is not ensured.

In the known welding sleeve, the inner body with the grooves for receiving the resistance heating wire is produced by an injection moulding process employing a two-part mold with an inserted mandrel. Since the injection molding point for this mold is normally in the center of the sleeve, it is impossible to avoid severe stressing of the webs for producing the grooves which are located in the immediate vicinity of the injection molding point. Thus, only a limited number of inner bodies can be produced with this mold.

BRIEF DESCRIPTION OF THE INVENTION

An object of the present invention is to provide a welding sleeve which prevents unsound welds even if the connection is not fully inserted to the sleeve.

Another object of the present invention is to provide a mold for producing the inner body of a welding sleeve having an increased service life and producing an increased number of workpieces.

Other objects, advantages and salient features of the present invention will become apparent from the following detailed description of preferred embodiments of the invention.

Briefly described, the invention includes a welding sleeve for joining thermoplastic line members comprising inner and outer bodies of thermoplastic material and a resistance heating wire. The inner body extends along a an axis, has an outer surface with grooves separated by webs, and has a inner surface. The wall thickness of the inner body, between bottoms of the grooves and its inner surface, increases toward an axial center of the inner body. The resistance heating wire is received at the bottoms of the grooves. The outer body surrounds the inner body and wire and extends into the grooves.

By producing the welding sleeve in this manner, the inner part has a greater wall thickness at its axial center to prevent damage to the sleeve resulting from heating without full insertion of the connections.

The invention also includes a mold assembly for producing a welding sleeve for joining thermoplastic line elements comprising a first part and a mandrel. The first part has a hollow cavity with a plurality of webs extending radially inwardly from an inner peripheral surface thereof to free edges of the webs, and defines grooves between the webs. The mandrel is inserted into the cavity and has an outer peripheral surface. This distance between the web free edges and the mandrel outer peripheral surface increases toward the axial center of the mold.

By forming the mold assembly for producing the inner body of the welding sleeve in this manner, the space between the first part and the mandrel decreases from an axial center of the assembly where a gate or injection moulding point iss located thereby aleviating stress on the webs closest to the axial center.

BRIEF DESCRIPTION OF THE DRAWINGS

In order that the manner in which the foregoing and other objects are attained in accordance with the invention can be understood in detail, particularly advantageous embodiments thereof will be described with reference to the accompanying drawings, which form a part of this specificiation, and wherein:

FIG. 1 is a diagramatic, side elevational view, in cross section, illustrating a welding sleeve in accordance with the present invention;

FIG. 2 is an enlarged view of a portion of FIG. 1 illustrating a welding sleeve in accordance with a first embodiment of the present invention;

FIG. 3 is an enlarged view of a portion of FIG. 1 illustrating a welding sleeve in accordance with a second embodiment of the present invention;

FIG. 4 is a side elevation view illustrating a mold assembly for producing the welding sleeve of FIG. 2; and FIG. 5 is a partial, side elevational view illustrating a mold assembly for producing the welding sleeve of FIG. 3.

DETAILED DESCRIPTION OF THE PREFERRED EMBODIMENTS

FIG. 1 shows the connection 1 between two line members by a welding sleeve 4 in diagrammatic manner. The line members have connections 2, 3 introducted into welding sleeve 4 up to a stop member 5. In the vicinity of internal diameter 6 of sleeve 4, a resistance heating wire 7 is laid in turns with their ends connected to contact studs 8 located in recesses 9 of the sleeve.

On assembling the parts, a small clearance 10 is left between inner surface 6 of welding sleeve 4 and the external diameter of connections 2,3. If electric power is now supplied through resistance heating wire 7 in the vicinity of inner surface 6, sleeve 4 is softened and partly melted. Due to the expansion of welding sleeve 4 which has occurred during its production, it contracts and engages tightly connection 2, 3 and is welded thereto.

In order to ensure a completely satisfactory weld when one or both connections have not been introduced completely into welding sleeve 4 up to stop member 5, the sleeve is constructed in accordance with FIG. 2 or 3. In FIG. 2, sleeve 4 comprises a thermoplastic inner body 15 and a thermoplastic outer body 16 which embraces the inner body. On its outer surface, inner body 15 has webs 17 with intermediate grooves 18. Resistance heating wire 7 is placed in the bottoms of grooves 18. The inner wall thickness 19 is the material layer formed by the substantially cylindrical inner surface 6 of inner body 15 and the bottoms of grooves 18.

As can be gathered from FIG. 2, inner wall thickness 19 increases gradually towards the axial center of the welding sleeve where stop member 5 is located. The grooves 18 adjacent the axial ends of inner body 15 are of equal depth and consequently so is the inner wall thickness 19. From given grooves spaced from the axial ends of inner body 15, the inner wall thickness 19 increases. This increase takes place roughly at an angle of about 5° to about 15° and has a length of approximately 10 to approximately 30 mm, as a function of the welding sleeve size.

Thus, in the central area of the welding sleeve, there is a greater inner wall thickness 19, such that the resistance heating wire temperature has a delayed action in this portion compared with the actual welding zone in the axial ends of the heating wire coil. The later heating of the central part of the welding sleeve 4 also ensures that the portions of sleeve adjacent the ends of connections 2, 3, which otherwise form inwardly deforming points, are not or are only slightly inwardly deformed, thereby providing improved welding pressure. The later heating of the central part is equally advantageous if one of the connections was not completely inserted up to the stop member 5 in sleeve 4 by avoiding pronounced deformations, which could lead to interturn short-circuits of the heating wire 7 and weakening of sleeve 4.

In the embodiment of FIG. 3, the depth of grooves 18 remains constant. The increase in the inner wall thickness 19 towards the central part results from the inner surface 6 of inner body 15 having a conical configuration tapering toward the axial center of welding sleeve 4. The conical configuration of inner body 15 only extends over the central area of the welding sleeve. However, it is also possible to extend the conical configuration up to the axial end portions.

The mold for producing inner body 15, shown in simplified form in FIG. 4, has a two-part hollow body 25 defining a cavity 26 in which a mandrel 27 is placed. The inner peripheral surface of hollow body 25 has webs 28, corresponding to the grooves 18 of inner body 15, and between which there are grooves 29 corresponding to inner body webs 17. The inner wall thickness 19 is formed between the free edges of webs 28 and the outer peripheral surface of mandrel 27. The height of the webs 28 decreases towards the axial center of cavity 26, such that space between the web free edges and the mandrel outer surface forms the increase in the inner wall thickness 19 of inner body 15. An injection molding point 30 is provided in the center of cavity 26. As illustrated in FIG. 4, there is a larger passage in the central part of the mold for the improved flow of injected plastics material.

According to FIG. 5, this larger passage can also be obtained by a mold 25 whose webs 28 have a constant height, but whose mandrel 27 is conical and tapers towards the axial center. In this embodiment, the mandrel 27 has two parts such that the injection molded inner body 15 can be removed from mold 25 or separated from mandrel 27.

The material for the welding sleeve can be polyethylene, polypropylene, PVC or some other suitable plastics material. The welding sleeve material is appropriately the same or similar to that of the line members. The welding sleeve can also be used for joining other workpieces, provided that their ends are shaped in such a way that they can be inserted with a limited clearance into the sleeve.

The welding sleeve of the present invention improves the reliability of the connection of line members, even if the ends of the line members are not inserted completely up to the stop member in the sleeve. Together with the improvement to the welding sleeve, the life of the mold for the inner body is considerably increased.

While certain advantgeous embodiments have been chosen to illustrate the invention it will be understood by those skilled in the art that various changes and modifications can be made therein without departing from the scope of the invention as defined in the appended claims.

What is claimed is:

1. A welding sleeve for joining thermoplastic line members, comprising:
    an inner body of thermoplastic material extending along an axis, having an outer surface with grooves separated by webs and having an inner surface, said inner body having a wall thickness between bottoms of said grooves and said inner surface which increases toward an axial center of said inner body;
    a resistence heating wire received in said groove at said bottoms thereof; and
    an outer body of thermoplastic material surrounding said inner body and said wire and extending into said grooves.

2. A welding sleeve according to claim 1, wherein said wall thickness increases in a gradual progression forming a slope of about 5° to about 15°.

3. A welding sleeve according to claim 1, wherein said grooves decreases in depth toward said axial center.

4. A welding sleeve according to claim 3, wherein said inner surface is substantially cylindrical.

5. A welding sleeve according to claim 1, wherein said grooves have a constant depth and said inner surface tapers toward said axial center.

6. A welding sleeve according to claim 1, wherein said grooves adjacent axial ends of said inner body are of constant depth and said grooves therebetween decrease in depth toward said axial center.

7. A welding sleeve according to claim 1, wherein said webs have outer edges equally spaced from said axis of said inner part.

8. A welding sleeve according to claim 7, wherein said web outer edges define an external diameter of said inner body.

* * * * *